United States Patent [19]

Schuster

[11] 4,441,892

[45] Apr. 10, 1984

[54] PROCESS FOR THE GASIFICATION OF CARBONIFEROUS MATERIAL IN SOLID, PULVERULENT OR EVEN LUMP FORM

[75] Inventor: Ernst Schuster, Gummersbach, Fed. Rep. of Germany

[73] Assignee: Carbon Gas Technologie GmbH, Ratingen, Fed. Rep. of Germany

[21] Appl. No.: 406,357

[22] Filed: Aug. 9, 1982

Related U.S. Application Data

[63] Continuation of Ser. No. 208,821, Nov. 20, 1980, abandoned.

[30] Foreign Application Priority Data

Nov. 23, 1979 [DE] Fed. Rep. of Germany ....... 2947222

[51] Int. Cl.$^3$ .......................... C10J 3/16; C10J 3/46; C10J 3/54
[52] U.S. Cl. .................................. 48/197 R; 48/203; 48/206; 48/210
[58] Field of Search .................... 48/197 R, 210, 203, 48/206

[56] References Cited

U.S. PATENT DOCUMENTS

| | | | |
|---|---|---|---|
| 1,913,968 | 6/1933 | Winkler | 48/203 |
| 2,677,603 | 5/1954 | Van Loon | 48/206 |
| 3,607,157 | 9/1971 | Schlinger et al. | 48/197 R |
| 3,971,139 | 7/1976 | Matthews | 48/206 |
| 4,032,305 | 6/1977 | Squires | 48/206 |
| 4,074,981 | 2/1978 | Slater | 48/197 R |
| 4,200,438 | 4/1980 | Kaimann et al. | 48/206 |

Primary Examiner—Peter F. Kratz
Attorney, Agent, or Firm—Max Fogiel

[57] ABSTRACT

Disclosed is a process for gasifying carboanceous material with the use of two fluidized beds superimposed on a fixed bed, and a flue dust gasification chamber arranged inside the reactor between the fluidized beds.

7 Claims, 3 Drawing Figures

PROCESS FOR THE GASIFICATION OF CARBONIFEROUS MATERIAL IN SOLID, PULVERULENT OR EVEN LUMP FORM

This is a continuation of application Ser. No. 208,821 filed Nov. 20, 1980 and now abandoned.

BACKGROUND OF THE INVENTION

The present invention relates to a process for the gasification of carboniferous material in solid, pulverulent or even lump form; the process has the feature that there is provided a fluidized bed and dust gasification, possibly also fixed bed gasification, taking place jointly in a reaction chamber consisting of one or several stages. The solids separated from the produced gas are returned to said reaction chamber.

Processes applying the three gas/solid reactions in a reaction chamber are known. The fraction of finer solid particles, which is carried along by the product gas from the fluidized bed, is separated in a cyclone which is arranged above the fluidized bed in the reaction chamber. The solid matter separated in the cyclone falls directly to a gasification equipment which is connected to the lower exit of the cyclone and which consists of one gasification burner as well as of one gasification chamber. The dust gasification products (gas, solids and molten slag) leave the gasification chamber and are blown from above onto the fluidized bed. In this way they transfer part of their sensible heat to the fluidized bed. The molten slag shall be consolidated and shall be discharged through the fluidized bed into the fixed bed arranged below.

When the dust gasification products are being blown onto the fluidized bed, that part of the sensible heat of the dust gasification products which is used for heating the fluidized bed is the smaller the lower the depth by which the gas jet penetrates into the fluidized bed. As a result the dust gasification gas may not be cooled down sufficiently and the mixed temperature of dust gasification gas and fluidized bed gasification gas on the way to the cyclone will be higher than the one obtained by complete heat exchange within the fluidized bed. This creates the danger that ash particles, especially fine fractions, will remain in the fusion zone and will stick to the walls of the reaction chamber on the way to the cyclone and in the cyclone itself.

Under the prior art fluidized bed gasification process, the separation of gas and of solids discharged from the fluidized bed takes place in a cyclone which is accommodated either in the reaction chamber and from which the solids are returned to the fluidized bed through legs or outside of the reaction chamber and from which the solids are likewise returned to the fluidized bed.

But because of their fineness, these solids returned will be discharged again from the fluidized bed very quickly so that only part of the pure substance contained in them can be converted there. Under certain circumstances the circulation of this solid fraction may rise to considerable values and may cause enrichment of the ash in the fluidized bed. In actual practice only part success is achieved in the attempt made to obviate this disadvantage by arranging a very voluminous so-called contact chamber above the fluidized bed; additionally, oxygen for postgasification is introduced into such a contact chamber.

Combining cyclone, gasification burner and gasification chamber in one unit under a supplementary embodiment involves the decisive disadvantage from the viewpoint of the user that maintenance of the sensitive dust gasification burner is not possible or is possible only at the expense of considerable downtimes, because cyclone, dust gasification burner and gasification chamber are arranged as one cooled unit in the rection chamber itself. This greatly restricts the availability of an operating plant.

A further considerable disadvantage is to be seen in the circumstance that this dust gasification equipment must be operated under blind conditions, because it is not possible to detect if any solid matter at all or how much solid matter passes to the gasification burner through the four exits of the cyclone. A correct relationship of the gasification agent, e.g. oxygen, can therefore not be established. For safety reasons, it is necessary to ensure that hydrogen or cleaned gas produced in the plant itself is supplied to the dust gasification in a quantity allowing the oxygen to be converted completely even in the event of the solids supply failing. But hydrogen or cleaned product gas is the most expensive energy carrier used in the process.

Both are burnt to water vapor or water vapor and carbon dioxide, respectively, with the generation of a very high temperature and shall again convert, with the pure substance of the solids, to form hydrogen and carbon monoxide. It is an established fact that such processes do not take place completely, the less so the poorer the solid/gasification agent mixture and the shorter the time available at a given reaction temperature.

Under the prior art these mix ratios are not optimum, because the solids separate from the gasification agent under the effect of the centrifugal force.

Moreover, a gasification time of only 0.05 seconds is available in the prior art dust gasification equipment. This time only suffices for converting a very small part of the solid matter, because at a dust grain size of 0.1 mm at least 0.2 to 0.3 seconds are required for complete conversion at reaction temperatures in excess of 1,600° C.

It was also left out of consideration that under the prior art dust gasification processes, grain sizes of 0.1 mm, i.e. mean grain sizes of around 0.025 mm, are used, while the dust is discharged from the fluidized bed at grain sizes of up to 1 mm. The solids returned have, consequently, a mean grain size which, by at least one decimal power, is higher than upon dust gasification. This is the reason why at equal reaction temperatures and times also lesser pure substance of the returned solid matter is converted.

Under the prior art process, also the ash shall be fused completely, shall be granulated in the fluidized bed below, and shall be discharged from such bed. But at a reaction temperature of 1,600° C. and an ash fusion point of, say, 1,300° C., an ash grain of 0.1 mm in diameter requires already a fusion time which is close to 0.3 seconds.

This means that in the prior dust gasifier part, only a small fraction of the pure substance is converted and only a small part of the ash is fused.

In this way the quantity of the circulating and permanently returning solid matter is increased so that under certain circumstances the amount of solid matter introduced through the gasification burner is exactly the same as the one or is larger than the one admitted to the fluidized bed and fixed bed zones together. But this results also in a high oxygen and gas demand, because the solid matter returned several times must also be heated several times from, say, 1,000° C. to 1,600° C. Furthermore, it is then no longer possible to coordinate the heat balance between the fluidized bed and the dust gasification products, because the fraction of the dust gasification products is too high.

SUMMARY OF THE INVENTION

The present invention has the object of providing a process which obviates these disadvantages and enables the use of combined processes in actual practice.

For attaining this object, it is proposed to gasify solid, pulverulent or even lumpy carboniferous material with oxygen and/or air, possibly also with water vapor, at pressures from 1 to approximately 80 bar in a process under which fluidized bed and dust gasification, possibly also fixed bed gasification, take place jointly in a reaction chamber consisting of one stage or of several stages. The solids separated from the produced gases are returned to the reaction chamber. The process has the feature of two fluidized bed gasification stages arranged above each other and connected between each other following, in direction of the gas stream, a fixed bed gasification stage—possibly an existing one. The raw solid matter is introduced into the lower fluidized bed and one or several dust gasification chambers, with gasification burners mounted outside of the reaction chamber, dip into the fluidized bed or end directly above it. The solids are returned to the gasification burners either directly from one or several cyclones arranged above the upper fluidized bed in the reaction chamber or after separation from the produced gas in separators which are arranged outside of the reaction chamber and which are or is followed or preceded by a solids cooling system after which the cooled solids may still be subjected to size reduction.

The raw fuel to be gasified is introduced into the lower fluidized bed, e.g., laterally by means of worm conveyors, through a downcomer from above or in any other manner. The grain size of the fuel ranges from 0 to 100 or also only from 0 to 30 mm when a fixed bed is arranged underneath the fluidized bed, whereas it ranges from 0 to 8 or 10 mm when only a diminished fixed bed or only an ash discharge is available. In the former case the fine fraction of the coal, i.e. the fraction which is smaller than 1 mm, may be approximately 15 to 20%, while in the second case values of, say, 40% may be reached.

For maintaining the fluidized bed it is necessary that the fluidizing velocity of the gas, which flows through the fluidized bed and has been produced from gasification agent and coal, is approximately 3 to 4 times as much as the so-called loosening velocity which is referred to the mean grain of the fluidized bed. At the grains which are larger than the mean grain the relationship between fluidizing and loosening velocity is then smaller than 3 to 4. These coarse particles move in the lower part of the fluidized bed or fall out of it. The situation is inverse for the grain fractions which are finer than the mean grain. They move in the upper part of the fluidized bed and are discharged from it, together with the gas, from a certain size onward. With rising gasification pressure the loosening velocity lowers—to a larger extent in case of coarser particles than in case of finer ones—; consequently also the fluidizing velocity actually required decreases. The stability of the fluidized bed increases. The coarser fines which, in operation at zero pressure, would be discharged upwardly will remain in the fluidized bed and will thus diminish the percentage share of the solids discharged from the total fuel quantity introduced into the reaction chamber.

The fine solids discharged from the fluidized bed after a relatively short time are only degassed or partly gasified. For economic reasons it is necessary to return these solids into the system for complete gasification, at least when the fuel costs are high.

According to the present invention, it is most appropriate to deliver this fine grain fraction to gasification burners which are arranged outside of the reaction chamber so as to allow easy maintenance is actual operation.

As one of the possibilities for achieving this end, there is proposed to subdivide the fluidized bed into two fluidized bed stages which are connected by a transition of smaller cross section.

The gasification burner(s) is (are) arranged, outside of the reaction chamber, in the zone where the cross section is reduced. Below these burner(s) there are the gasification chambers which extend into the reaction chamber and dip into the lower fluidized bed or end closely above it. In the further development of the present invention it is also proposed to give each dust gasification chamber such a length and such a volume as to create, above the fluidized bed, a steadying chamber with a height which corresponds at least to three times the height of the fluidized bed. The volume of the gasification chambers is sufficient, in relation to the gas quantity produced there, for gasifying at least half of the pure substance introduced and fusing at least half of the ash entered.

Furthermore, it is proposed to arrange the gasification chambers so as to end closely above the fluidized bed or to dip into it with a view to ensuring that the heat exchange between the hot gas jet issuing from the chambers, the molten slag and the fluidized bed is great enough for the molten slag leaving the gasification chamber to be solidified, at least superficially, to an extent which precludes any slagging by the coarse slag separated downwardly from the fluidized bed and by the fine slag particles carried along upwrdly with the gas stream.

Upon the partial gasification of coal dust with a grain size of <0.1 mm approximately 0.3 seconds are required for a pure coal conversion of, e.g., 70% at a reaction temperature of, e.g., 1,500° C. Approximately the same time is necessary in order to gasify the pure substance almost completely at temperatures of 1,600° C. and more. But also the ash fusion process is time dependent. To quote an example, approximately 0.3 seconds are also required for fusing an ash grain of 0.1 mm in diameter, when the ash fusion temperature is situated at 1,300° C. It follows that according to the present invention the residence time in the dust gasification chamber, at grain sizes of 0.1 mm and at a reaction temperature of 1,600° C. and more, is at least 0.2 seconds in order to achieve a sufficient value for the fuel conversion and the slag fusion. The factors which must be coordinated between each other are consequently: grain fineness, reaction temperature, residence time and ash fusion point.

Pure substance and ash are mixed in a coal grain. Experience indicates that the ash structure commences to fuse only when at least 80% of the pure substance have been removed.

Thus the fusion process is delayed additionally, i.e. fusing the ash of a coke grain requires a longer residence time in the dust gasification chamber than a pure ash grain of the same size does.

It is an advantage that by the rotary flow which the gasification burner enforces in the gasification chamber the heavy ash particles quickly pass to the enclosure walls where, with their softening surface, they impinge upon and stick to the molten slag film already existing or upon and to ash particles which are in an advanced stage of softening. Then more time is available to them for liquefaction than in the gas stream alone.

It is appropriate to design the exit of the molten slag from the gasification chamber in a manner allowing the slag to enter into the fluidized bed in liquid jets which are so thick that the solidification in the fluidized bed produces slag grains falling definitely downwards out of the fluidized bed.

The saving of oxidizing agents, e.g. oxygen, for heating the fluidized bed is determined by the quality of the heat exchange between fluidized bed and dust gasification products. When the dust gasification products enter into the fluidized bed at a temperature of, say, 1,600° C., only just as much oxygen, in addition to the necessary steam, is introduced from below into the fluidized bed as to obtain a fluidized bed temperature of, e.g. 1,000° C., at which the gasification products leave the reaction chamber. The upper limit of this temperature is determined on the one hand by the necessary gasification rate and on the other hand by the softening behavior of the ash or slag, respectively.

Passing the dust gasification products to closely above the fluidized bed or into it causes there a considerable turbulence; this allows a greater upward discharge of coarser particles from the fluidized bed to be expected than in case of a normal fluidized bed. According to the present invention, it is therefore suggested to arrange a steadying chamber above the fluidized beds so that the coarser particles flung out of the fluidized bed have the possibility of falling back into it; the height of the steadying chamber should at least be three times as much as that of the fluidized bed.

A fluidized bed has the characteristics of high heat and mass transfers as well as a very uniform temperature distribution over the bed cross section. Because of the large bed mass the heat stored in it, it is very high so that almost constant ambient temperature may be assumed upon heating the comparatively small quantity of raw fuel introduced. When coal with grain sizes of, e.g., 0 to 50 mm is being introduced, the individual grain sizes—ball shape being presumed for the sake of simplicity—heat up more quickly the smaller their diameter.

Because of the high heat transfer to the coal ball in the fluidized bed and the very small thermal conductivity of the coal, the surface temperature of the coal may be established, over a certain period of time, greatly in advance of the grain core temperature, i.e. there will be considerable temperature differences which increase with growing grain size. The temperature drop from the grain surface to the core occurs practically already in the outermost grain layer.

These temperature differences, together with the development of the coal volatiles upon heating as well as the friction and collision effects in the fluidized bed, may cause further size reduction of the solids introduced. As a result the coarse fraction passing to fixed bed gasification may become smaller than expected according to the grain characteristic of the raw product, while the fine fraction discharged from the fluidized bed may become larger.

The solids fraction discharged upwardly from the lower fluidized bed in spite of the steadying chamber arranged above passes to the upper fluidized bed through the smaller cross section chosen here. This method is only one of the possibilities existing for transition. As only the finer fraction of the total grain assortment introduced is treated in the upper fluidized bed, it is an advantage to design this stage, due to the lower fluidizing velocity required, with a larger cross section than the lower fluidized bed; as a result, it is possible to increase considerably the gasification time of the fine particles discharged from the lower fluidized bed too quickly. The dust fraction still discharged with the gasification gas passes, after the steadying chamber above the upper fluidized bed, to the separators in which gasification gas produced is separated from the coke dust remaining.

This separation point—also several of it may be provided for—may be arranged both in the reaction chamber and outside of it. When separation of gas and coke dust is arranged in the reaction chamber, it will take place at very high temperatures, e.g. at 900° to 1,000° C. It is an established fact that the separation efficiency of a cyclone is much poorer at high temperatures than at low temperatures, unless a higher pressure loss is accepted. It is understood that separation at high temperatures may also take place outside of the reaction chamber. But it is appropriate to cool the gas/coke dust mixture by means of heat exchangers to a reasonable temperature, e.g. 150° to 200° C., before accomplishing separation in electrostatic precipitators or in baghouses. Then it is possible to separate the solids from the reaction chamber into a coarser and a finer fraction, the coarser fraction being removed in the deflections of the heat exchanger for cooling the gas/dust mixture, e.g. a heat recovery boiler, and the finer fraction in the electrostatic precipitator or the baghouse. According to the present invention the solids from fine dust separation are directly supplied to the gasification burners, if they still have an excessive amount of pure substance, while the solids from coarse dust separation, e.g. from the waste heat recovery boiler, are either directly introduced into one of the fluidized beds, preferably the lower one, or are supplied to the gasification burner after having been ground to grain sizes of <0.1 mm. When, after coarse dust separation, the solids from fine dust separation are eliminated from the process because of an excessive ash content, the coarse fraction or the ground coarse fraction may also be supplied to gasification burners. The gasification chambers of these are not arranged in the reaction chamber but laterally to it in zones of low mass density, e.g. in the transition between fixed bed and fluidized bed or in the area of the steadying chambers. Ash fusion is then no absolute necessity. The temperatures applied in this case do not exceed, e.g., 1,450° C. at gasification times of the order of 0.5 seconds. The pure substance conversion will amount to more than 60% so that a 1.5-fold circulation of the fines would be accepted. When one or several gasification chambers are laterally arranged, attention must be paid to the relationship between the heat quantity introduced through them and the one existing in the corresponding zone of the reaction chamber, because at no point must a temperature be exceeded which might cause the ash to stick to the walls of the reaction chamber due to ash fusion.

Furthermore, it is to be borne in mind that upon oblique arrangement of the dust gasification equipment, the flow pattern in the dust gasification chamber and, consequently, the conversion of the solids is disturbed the more the denser the medium into which the gasification products must flow.

When arranging one or several cyclones in the steadying chamber of the reaction space before the gas exit, the dust separated there falls directly to the gasification burners arranged subsequently and mounted externally on the gasification chambers; furthermore these burners receive also the gasification agents, namely oxygen and/or air and possibly water vapor, which are simultaneously used for transporting the separated dust through the gasification chambers. As the quantity of dust separated from the cyclones is not known, but the gasification agents must be related to this dust quantity, it is appropriate to carry out density measurement of the stream in the supply pipe to the gasification chamber by means of radiation instruments as a basis for control. The relation of the gasification agents to the solid matter to be gasified can be established more exactly when the dust separated from the gas/dust mixture inside or outside of the reaction chamber is not supplied to the gasification burner directly but via an intermediate tank. A further advantage is given by the fact that the pressure range available to the gasification agents for surmounting the pressure losses after the burner, is very much larger than, e.g., in case of a direct transfer of the separated dust from the cyclone to the burner by means of injectors or diffusors.

As mechanical coke dust feeders are not able to withstand very high dust temperatures, the invention suggests cooldown of the separated dust, e.g., in the intermediate tanks. When separated dust is ground before postgasification, cooldown of the dust is adequate, also under this aspect. The heat withdrawn from the hot coke dust as well as from gas and coke dust in case of joint cooldown is transferred, according to the invention, to fluids required in the gasification process, while the surplus is transferred to extraneous fluids, e.g. for the generation of steam required by a turbine.

The dust quantity discharged from the reaction chamber may greatly fluctuate. To compensate for these fluctuations, but also for other reasons, the invention provides for the possibility of supplying the gasification burner or the gasification burners also with other fuels, such as pulverized coal, tar, fuel oil or the like, in addition to or instead of the partly gasified solids returned. It would, e.g., also be possible to use blast furnace dust in order to win a high-iron slag which might be processed to become sponge iron. On principle it would consequently be possible to use additionally materials which might make a contribution to the gasification process, because, e.g., they are no longer economically utilizable otherwise or enable the winning of a utilizable further product in addition to the gas.

When the solids separated from the gas are ground and returned to the dust gasification burner, the invention suggests to delete the upper fluidized bed, which performs essentially the function of offering an additional possibility for gasifying the coarser dust fractions discharged from the lower fluidized bed. But due to their relative fineness, these particles will also not stay there long enough, unless the cross section of the upper fluidized bed is larger than the one of the lower stage. A certain amount will, therefore, also be discharged from the upper fluidized bed. But when the coarser fractions are ground, it is not decisive whether, e.g., 15 or 20% of the fuel quantity introduced into the reaction chamber are ground to form coke dust, if a pulverizing installation exists anyway. Coke dust which has been produced by quickly heating coal dust requires less pulverizing energy than coal dust of equal size.

At least to a large extent, it would be possible to do without a large steadying chamber arranged hitherto above a fluidized bed, because also the transition to, e.g., the downstream waste heat recovery boiler may be used to this end.

The raw fuels introduced into the fluidized bed will be separated there by grain sizes. Grains below, e.g., 1 mm will upwardly be discharged from the fluidized bed more or less quickly, while grains which are larger than, e.g., 10 mm will fall into the fixed bed. Moreover, the coal grains will be heated at a rate which depends upon the grain size.

More or less complete degassing, i.e. conversion from coal grain to coke grain, will take place during separation by grain sizes and during the process of heating at different rates. Within the relatively short time from introduction into the fluidized bed to discharge of the coarse grain fractions into the fixed bed the fine grain below 1 mm will practically be degassed and partly also gasified to a certain extent, while, e.g., the 50 mm grain will fall into the fixed bed in a superficially pretreated condition.

The gasification agent will be introduced into the fixed bed from below where also the hottest zone will be. The gas formed there will flow through the charge upwardly, will transfer heat to the solids to be heated and will flow at a relatively low temperature to the fluidized bed, where the condensable constituents, such as tar, will be dissociated. As already mentioned, this transition from the fixed bed to the fluidized bed may be used for arranging the dust gasification equipment, especially when dust gasification or partial gasification takes place at temperature at which ash fusion does not yet occur. But when molten slag is then discharged into the fixed bed after all, slagging possibly occurring in the fixed bed must be obviated by fluid-dynamic measures, e.g. periodically intermittent feeding of steam, so that the gas flow is safeguarded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
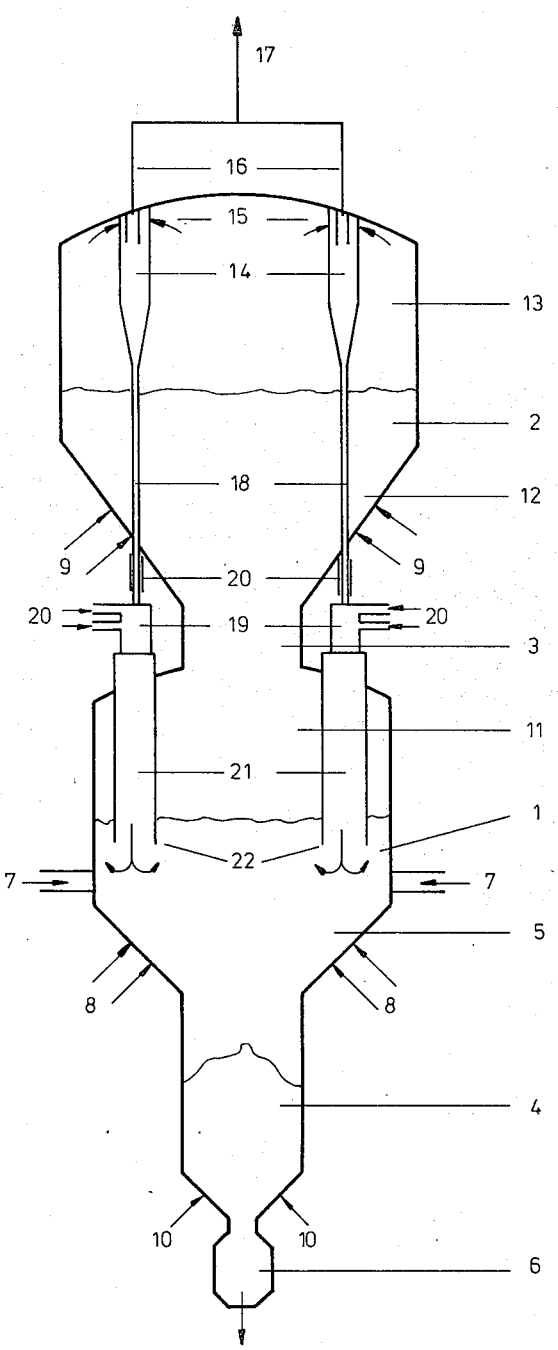
FIG. 1 is an elevational schematic view of one embodiment of the present invention, and shows a longitudinal section thereof.

FIG. 1 represents an embodiment where the coke dust is separated in cyclones within the reaction chamber above the upper fluidized bed stage, each with one direct admission to gasification burners which are arranged outside of the reaction chamber and the gasification chambers of which extend into the lower fluidized bed stage. The embodiment represented may, on principle, be realized for operation at pressure and at zero pressure. The total reaction chamber comprises the lower fluidized bed stage 1, the upper fluidized bed stage 2, the connecting section 3 between the two fluidized bed stages, the fixed bed stage 4 with the transition 5 to the fluidized bed as well as the ash or slag locks 6, respectively.

The fuel to be gasified is introduced by worm conveyors 7 into the lower fluidized bed 1; the gasifying agents, namely oxygen and/or air as well as possibly water vapor, are added at 8. Adding the gasifying agents also at 9 for the upper fluidized bed 2 and at 10 for the fixed bed 4 depends upon the fractions to be gasified there; it is appropriate to preheat such agents to an extent which is economically reasonable. While the coarse parts penetrate from the lower fluidized bed stage 1 through the transition element 5 into the fixed bed stage 4, the fine particles are transported through the steadying chamber 11 and the connecting section 3 as well as the transition element 12 into the upper fluidized bed stage 2 in order to be gasified there to a further extent, possibly by adding further gasifying agents at 9. The upper fluidized bed stage 2 has a larger cross-section than the lower fluidized bed stage 1.

The solid matter discharged from the upper fluidized bed stage 2 passes with the gas through the steadying chamber 13 to the cyclones 14 into which they enter at 15. The gasification gas leaves the cyclones 14 through lines 16 to, e.g., a collecting main 17 connecting with downstream heat exchangers for cooling the gas. The coke dust separated falls through legs 18 to the gasification burners 19 to which gasifying agents, e.g. oxygen and water vapor, are supplied in a suitable manner through admissions 20. Between the exit of the leg 18 from the upper fluidized bed area 2/12 and the entry into the gasification burner 19 there is a measuring section 20 where the quantity of the coke dust flowing downwardly is measured through density measurements by radiation instruments. The value measured constitutes the signal for the quantity and the ratio of the gasifying agents introduced into the gasification burner 19 at 20; this ensures their correct relationship to the quantity of coke dust. It is also possible to supply extraneous solid, liquid or gaseous fuels additionally through the burners 19. Under the dust gasification burner 19 there is the dust gasification chamber 21 which is designed in accordance with the gasification temperature, i.e. it is e.g. cooled and lined with refractory material, especially when the slag is discharged in the molten condition. In this case the exit 22 of the dust gasification chamber is of a design allowing the molten slag to escape via an overflow into the fluidized bed 1 in one slag stream or in several slag streams which is or which are so thick that a granulate will be produced there and will have a size allowing it to enter downwardly into the fixed bed. From there the ash and slag are removed from the system through the ash lock 6.

When the quantitative fraction of the dust gasification gas is small in relation to the total gas quantity of the fluidized bed, the dust gasification chamber 21 must not absolutely dip into the lower fluidized bed 1. But it must do so the more the higher this fraction, because otherwise the temperature of the mixed gas flowing to the upper fluidized bed stage 2, including the solids carried along, will become too high. Fine slag particles, which were previously liquid, will possibly not solidify sufficiently so that they may deposit on the walls.

It is understood that instead of several cyclones, e.g. 2 or 4, it is also possible to use only one central cyclone at the solids outlet of which a distribution is made over several legs the number of which corresponds to that of the dust gasification burners.

Figure 2:
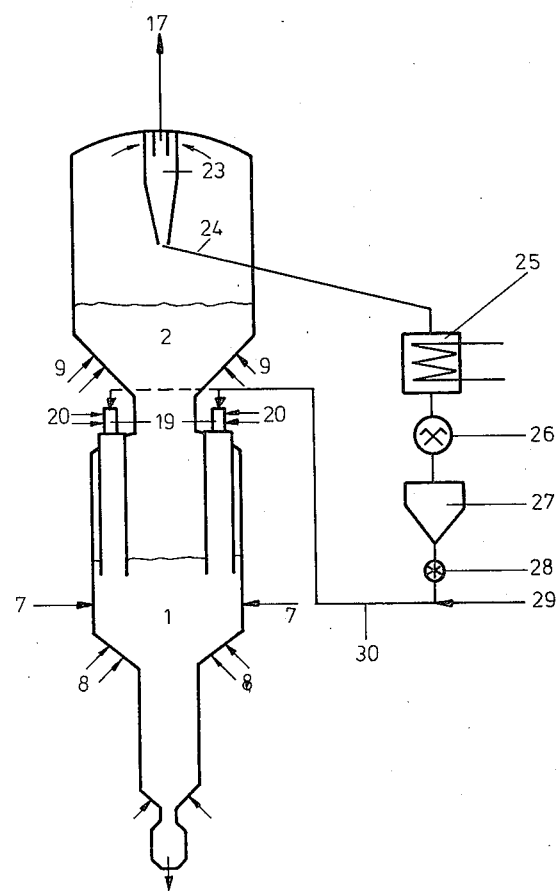
FIG. 2 is an elevational view shown schematically in longitudinal section of another embodiment of the present invention.

FIG. 2 shows an example of central fine-dust separation 23 in the reaction chamber; the solids separated are discharged through line 24 to a collecting tank 25 which is situated outside of the reaction chamber and in which the dust may be cooled down. The dust will be supplied to a mill 26 in which it will be ground and from which it will be delivered to the gasification burners 19 by way of an intermediate bunker 27, a feeder 28 and line 30; a carrier gas 28, e.g. or stream, will be used to this end.

The combination would be similar if the central separator 23 were not arranged in the reaction chamber, but immediately after the exit of the gas/dust mixture from the reaction chamber. In the same manner as in FIG. 2, the waste-heat recovery boiler would, e.g., follow the exit 17 so as to cool the gas and the residuary dust.

Figure 3:
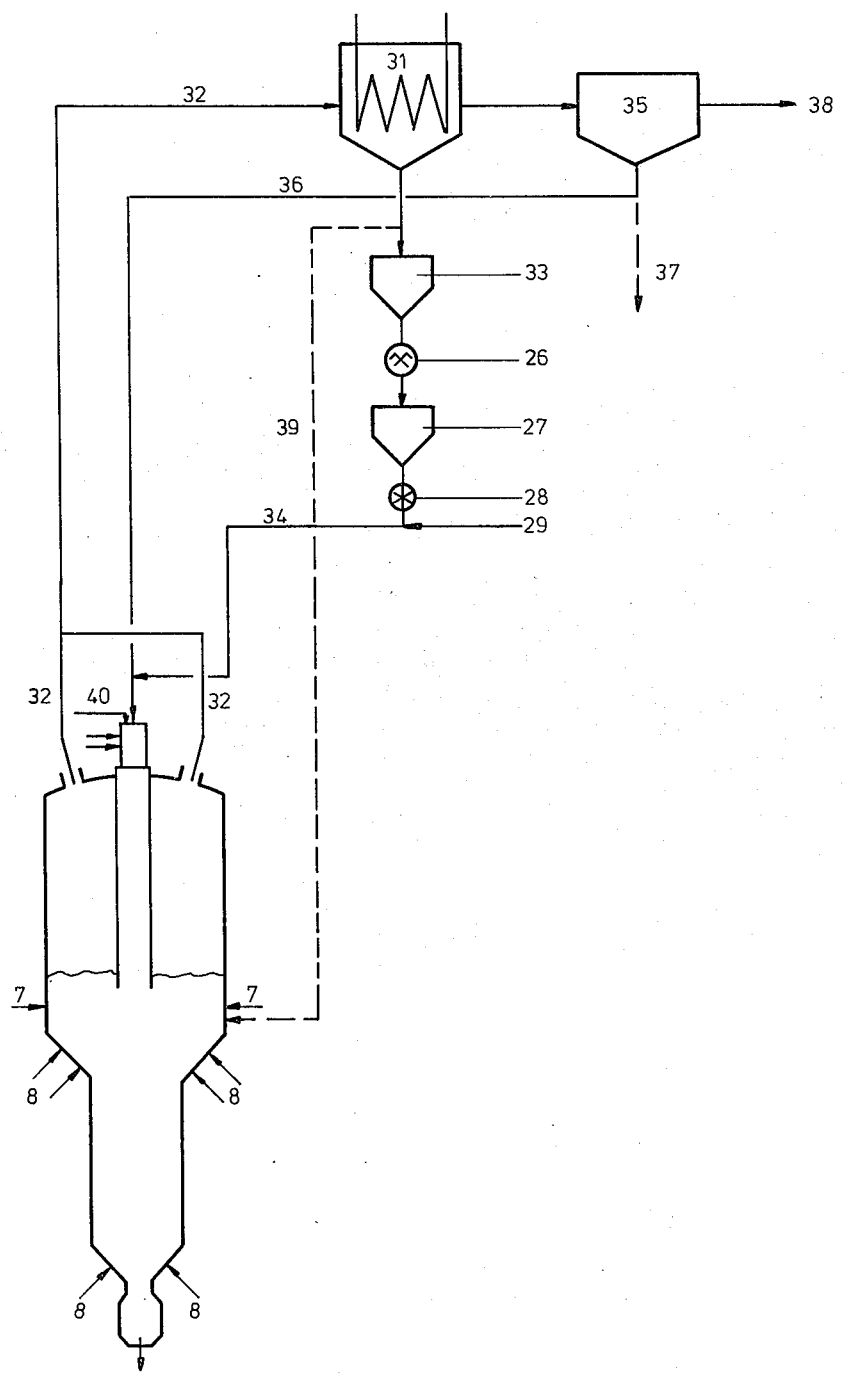
FIG. 3 is an elevational view of a further embodiment of the present invention.

The embodiment shown in FIG. 3 does without the upper fluidized bed stage 2, while the gasification equipment directly precedes a waste-heat boiler 31 to which the gas/dust mixture of gasification is supplied through a line or a duct 32.

The coarse fraction of the dust carried along is separated in the deflections of the waste heat boiler 31 and is collected in tank 33 from where it is supplied to the pulverizing plant 26; as fine coke dust, it is ultimately transported from bunker 27 and feeder 28 to the dust gasification chamber by means of a carrier gas 29 and through line 34; also other, extraneous fuels may be admitted to said chamber at 40. The waste-heat boiler is followed, e.g., by an electrostatic precipitator 35. The fine dust separated there is supplied to the dust gasification burners through line 36 or is removed from the process through line 37. The gas freed from fine dust passes through line 38 to the gas cleaning plant. The coarser fine fraction separated in the waste heat boiler 31 may, e.g., also be returned directly in the fluidized bed through line 39.

The present invention offers the following advantages:

Possibility of establishing an optimum relationship of the gasifying agents to the coke dust to be gasified. Optimum heat exchange between dust gasification products and the reactants of fluidized bed gasification. Optimum dust gasification and ash fusion by increasing the reaction surface of the matter returned. Good access to the dust gasification burners arranged outside of the reaction chamber. Optimum design of the dust gasification burners by controlling all gasification partners supplied. Optimum possibility for the configuration of the dust gasification burners, also for the admission of additional, extraneous fuels: large range available for varying the dipping depth of the dust gasification chamber into the fluidized bed, because there is no dependence upon pressure drops to be overcome.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Process for the gasification of carbonaceous material in solid form, with at least oxygen, at pressures from 1 to approximately 80 bar in a fluidized bed, the process comprising the steps of: arranging two fluidized bed gasification stages above each other in a reaction chamber and connecting said two stages to each other; supplying carbonaceous material and oxygen to the lower fluidized bed and supplying gasifying agent to the upper fluidized bed,; separating solids containing pure substance and ash from gas leaving the upper fluidized bed; supplying the separate solids to at least one flue-dust gasification chamber via a gasification burner said flue-dust gasification chamber being arranged substantially entirely inside said reaction chamber and extending from a location between said lower and upper fluidized beds downwardly into and below the upper surface of the lower fluidized bed and with the upper portion of the flue-dust gasification chamber being connected to a mounted gasification burner located outside the reaction chamber said flue-dust gasification chamber having a size for allowing adequate time for both carbon conversion and ash melting; at least one flue-dust gasification chamber releasing as products gas and liquid slag into the lower fluidized bed; a direct heat release taking place from said products to the lower fluidized bed; the liquid slag solidifying in the fluidized bed and precipitating at the bottom as a granulate into a fixed bed gasification stage underneath the fluidized bed stages.

2. Process according to claim 1, including the step of supplying other fuels to the gasification burner.

3. Process according to claim 1, including the step of supplying separated solids to at least one gasification burner either directly from at least one cyclone arranged above the upper fluidized bed in the reaction chamber or after separation from the produced gas in at least one separator arranged outside of the reaction chamber; cooling down solid matter to be separated; and reducing the size of the cooled solid matter.

4. Process according to claim 1, including the step of pulverizing separated solids before supplying them to the dust gasification chamber.

5. Process according to claim 1, wherein in addition water vapor is supplied to the lower fluidized bed as gasification agent.

6. Process according to claim 1, wherein the solids separation includes coarse dust separation and the fine dust separation, returning solids from fine dust separation directly to the gasification burner if their pure substance content is still high, introducing solids from coarse dust separation either into the lower fluidized bed or after having been pulverized to grain sizes of substantially 0.1 mm, to the gasification burner.

7. Process according to claim 1, wherein the reaction chamber is sized in length and volume so as to obtain, above the lower fluidized bed, a stabilization chamber of a height corresponding at least to three times the fluidized bed height, at least one flue-dust gasification chamber having a volume which, in relation to the gas quantity produced there, ensures that the residence time in the dust gasification chamber will be sufficient to gasify at least half of the ash entered, corresponding to at least 0.2 seconds at temperatures exceeding substantially 1,600 deg. C. at grain sizes below 0.1 mm and at an ash fusion temperature of substantially 1,300 deg. C.

* * * * *